United States Patent [19]
Wiecha

[11] Patent Number: 5,870,717
[45] Date of Patent: Feb. 9, 1999

[54] SYSTEM FOR ORDERING ITEMS OVER COMPUTER NETWORK USING AN ELECTRONIC CATALOG

[75] Inventor: Charles Francis Wiecha, New York, N.Y.

[73] Assignee: International Business Machines Corporation, Armonk, N.Y.

[21] Appl. No.: 558,065

[22] Filed: Nov. 13, 1995

[51] Int. Cl.⁶ .................................. G06F 153/00
[52] U.S. Cl. ............................... 705/26; 235/385
[58] Field of Search .................. 395/201, 226–228, 395/244; 379/91.01; 340/825.26–825.28, 825.33–825.35; 283/56; 235/378–381, 385; 902/22, 30–33; 705/1, 26–28; 707/1, 10, 200

[56] References Cited

U.S. PATENT DOCUMENTS 4,992,940 2/1991 Dworkin .......................... 235/383
5,315,504 5/1994 Lemble .......................... 395/650
5,319,542 6/1994 King, Jr. et al. .................. 235/383
5,570,291 10/1996 Dudle et al. ...................... 364/188
5,576,951 11/1996 Lockwood ........................ 395/227

Primary Examiner—Frantzy Poinvil
Attorney, Agent, or Firm—Stephen C. Kaufman, Esq. IBM Corporation; Scully, Scott, Murphy & Presser

[57] ABSTRACT

Current corporate purchasing procedures are labor-intensive and therefore costly. The system enables an employee who needs an item which must be ordered from a supplier to select the item from an electronic catalog displayed on a personal computer and submit an order for approval and processing directly, by-passing both the normal paper approvals and the manual verification of the order by the organization's Purchasing department. It achieves this by means of an electronic catalog accessible from the employee's own personal computer, and a computer network and associated services linking the enterprise to one or more suppliers.

6 Claims, 12 Drawing Sheets

SYSTEM FOR ORDERING ITEMS OVER COMPUTER NETWORK USING AN ELECTRONIC CATALOG

FIELD OF THE INVENTION

This invention relates to a system for electronically linking a buyer and a seller in a purchasing cycle.

INTRODUCTION TO THE INVENTION

Current procurement procedures in corporations of all sizes are largely manual, or at best semi-automated by electronic mail, and are as a consequence labor-intensive and costly. Typical procedures operate as described below. Refer to the attached drawings, which make the description easier to follow:

1. Typically, an employee requiring some item (such as a piece of office equipment) will look for it in a supplier's catalog. Such catalogs may be at the user's workstation, but are often kept in some central location for general reference (see FIG. 1, numeral 10).

2. The employee transcribes information (such as part numbers and price) from the catalog on to a purchase order (FIG. 1, step 01).

3. The completed purchase order then normally goes through an approval process, which may, depending on the value of the order and the nature of the items on it, require several sign-offs by people within the corporation with budgetary responsibilities (FIG. 1 step 02).

4. The purchase order is then sent to the purchasing department of the corporation, which checks the information. These checks include verifying that the items are being ordered from the correct supplier: the same item may be offered by more than one supplier, but contracts are frequently negotiated that require a particular item to be procured from only one of these suppliers, and the Purchasing department has to verify this (FIG. 1, step 03).

5. The Purchasing department then sends the Purchase Order to the supplier (FIG. 1, step 04).

The process described above can take weeks if not months.

At the other end of the procurement process, printing and distributing the traditional paper catalog is also a labor-intensive and costly process (see FIG. 2, numeral 12), especially since catalogs are usually of high quality in terms of art-work and color reproduction (FIG. 2, step 01) but may be distributed at no charge to potential buyers. The long production time for a typical catalog (of the order of several months) causes additional problems when it includes items such as personal computers and consumer electronics where prices are highly volatile. Vendors have sought a number of solutions to this problem, the most common being to omit prices from the catalog altogether and issue a separate list of prices (FIG. 2, step 2) several times throughout the lifetime of the catalog.

In response to this situation, we now disclose a novel system for ordering items. The system comprises:

1) means for receiving and processing images and text from a plurality of catalog content providers for creating and maintaining one or more electronic catalogs in a central location for subsequent distribution over a computer network;

2) means for receiving supplier's price and catalog changes and propagating them to one or more selected buyers over a computer network;

3) a first end-user computer system comprising user interface and able to access disk storage on a shadow catalog server;

4) a shadow catalog server which comprises a second computer system located within the enterprise whose disk storage can be accessed over a local area network by one or more end-users' computers in an efficient manner; said disk storage being being used to hold (1) one or more electronic catalogs, and (2) program code comprising a a "Catalog Browser" capable of transmitting purchase orders to a master buyer and server;

5) a master buyer server comprising a third computer system located within an enterprise containing (1) program code comprising an order manager and a purchase order workflow which takes purchase orders from one ore more end-user computers and and controls their flow through the enterprise's business processes before transmitting them over a network to the supplier; and (2) a purchase order data base.

The advantages of the novel system are appreciated by contrasting it to the prior art summarized above. In particular, the concept of corporations ordering items from suppliers over a computer network is well-established, and has led to the formalization of EDI (electronic data interchange).

The concept of consumers or end-users (the people who will ultimately make use of an item) ordering items from electronic catalogs over a (usually public) network is also well-established. Public network services such as Prodigy (tm), America On Line (tm) and Compuserve (tm) allow subscribers to their services to select consumer and household items from catalogs placed there by suppliers. The items are typically shipped to the subscriber's home, and the cost charged against a credit card. Such systems have to date only allowed the subscriber to access one supplier's catalog at a time.

It may be noted that neither of the above approaches is a complete solution to the problem addressed by the disclosed invention, which is to allow end-users within a corporation to order necessary items as if they were consumers ordering items for their own use and at their own expense, but to have such orders then flow through the enterprise's normal business controls before being submitted to the supplier. The disclosed invention also goes beyond these solutions in allowing the catalog an end-user sees to be sub-setted and otherwise modified from the supplier's general catalog; in facilitating comparisons between items from several suppliers; and in permitting orders to be generated containing items from several suppliers.

BRIEF DESCRIPTION OF THE DRAWING

The invention is illustrated in the accompanying drawings which.

DETAILED DESCRIPTION OF THE INVENTION

Figure 1:
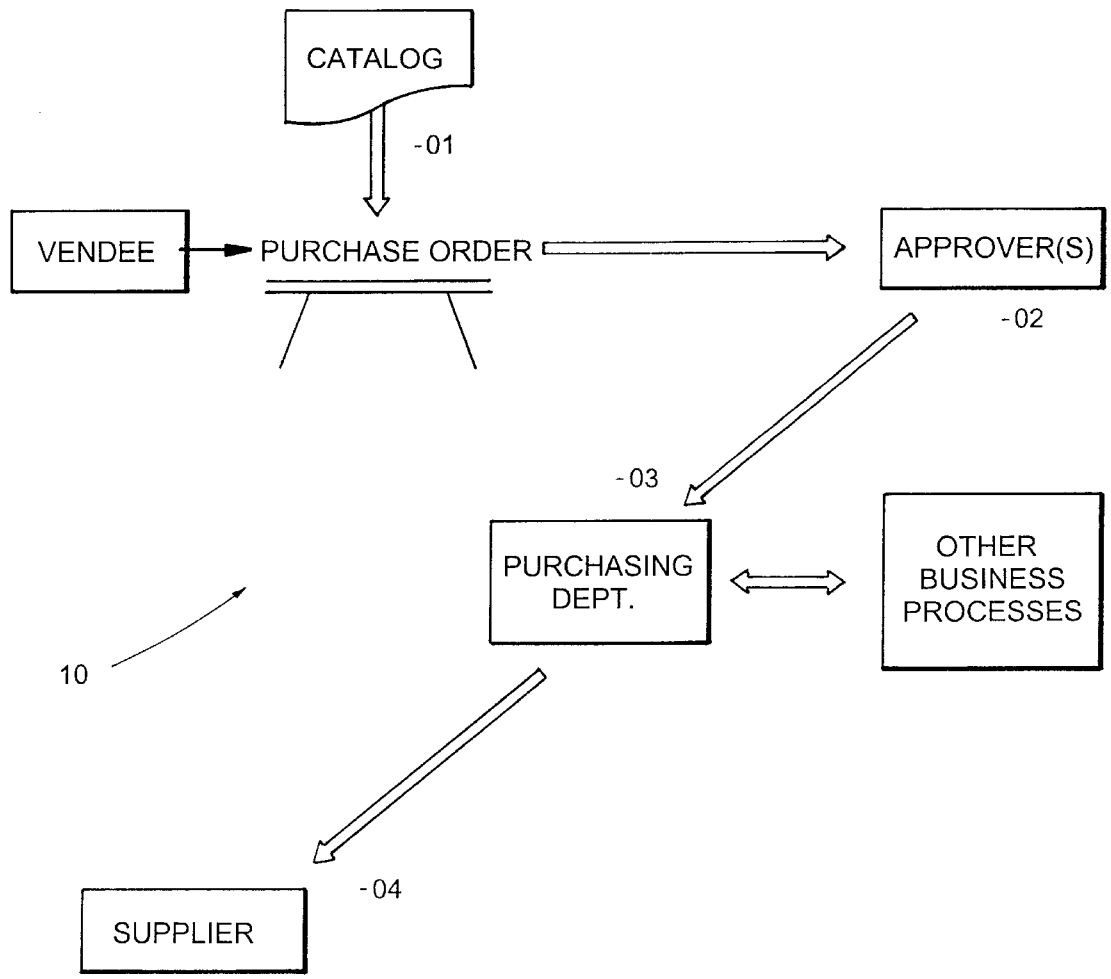
FIGS. 1 and 2 show prior art purchasing and catalog creation processes.

The disclosed invention automates much of the manual processing described above. The disclosed invention preferably is used in the following way (FIGS. 3, 4 numerals 14, 16 illustrate preferred steps involved):

1. An employee 17 preferably accesses one or more electronic catalogs 24 stored on a shadow catalog server 22, accessed via a local area network 20 preferably by means of a employee workstation 18. These catalogs contain only those items for which a price has been negotiated between the enterprise and a particular supplier, so the verification by the enterprise's Purchasing department described above is obviated.

2. The employee selects items from the catalogs preferably with a mouse or similar device. Catalog items may be displayed with pictures, descriptions and other information in a fashion similar to a paper catalog. Where similar items are available, a "Compare" icon can be selected on the screen, causing the items to be listed side by side, with differences highlighted. Items can be located by searching down the taxonomy tree of the catalog (much as one searches through a paper catalog by finding the appropriate general section and then looking for a particular item), or by entering a search word or phrase.

3. Items selected may be accumulated in a "clip-board", a temporary holding area on the user's computer disk. When all required items have been selected, the employee selects a "Submit" icon. This causes the selected items in the clip-board to be sent' to the appropriate approvers as a Purchase Order 30. It should be noted that there is no manual transcription of ordering information from the catalog to the purchase order (since that is performed by the disclosed system).

4. After the order has passed through the enterprise's normal (legacy) business systems, including a workflow definition database 26, a purchase order database 28, and other existing corporate applications 32, it is forwarded to the Maintenance Entity via the Network 34. From there it is sent to the supplier for fulfilment in a traditional way.

5. The employee can at any time review the purchase orders already submitted; cancel them if they have not yet been shipped; and print reports.

The other end of this process involves capturing catalog content (text and images as well as price information) in electronic form. As long as catalog content providers and suppliers continue to publish traditional paper catalogs side by side with the electronic versions, this activity does not displace the current manual process.

Figure 6:
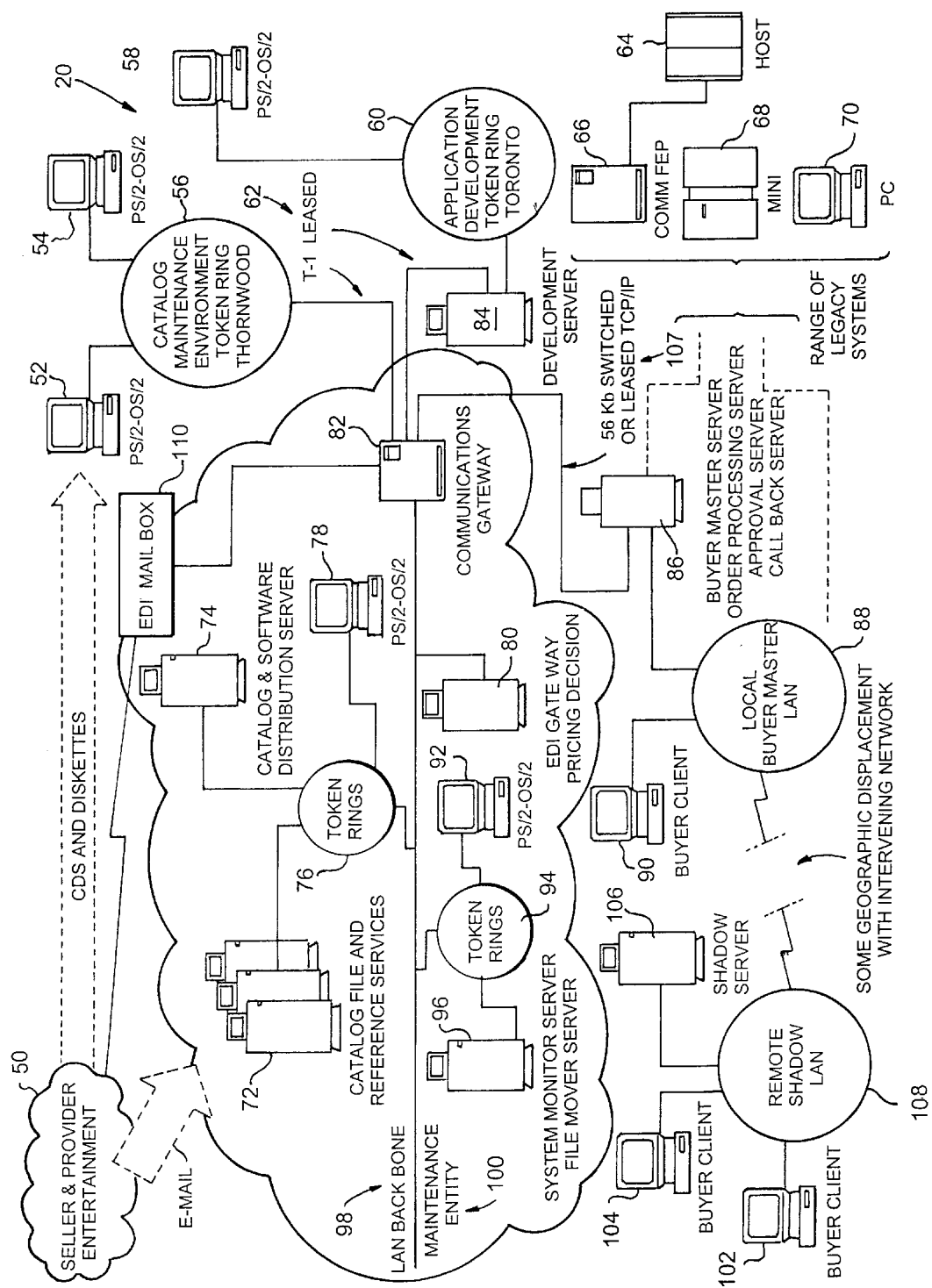
FIG. 6 shows an invention topological overview.

The two ends of this automated solution, the supplier side and the buyer side, may be brought together by means of a computer network and associated service offerings. FIG. 6, shows an overall network topology 20 or the initial implementation, with the three major pieces (supplier, buyer and Network Central) clearly distinguished. Suppliers 50 provide e-mail directly to the maintenance entity 100 and to the communications gateway 82 via an EDI mail box 110. Suppliers also provide CD's and diskettes for the to terminals 52 and 54 for the purpose of catalog creation and maintenance. Terminals 53 and 54 communicate with the maintenance entity through Token Ring THORNWOOD 56.

Maintenance Entity 100 consists of a local area network backbone 98 which supports multiple token rings 76 and 94 in addition to a communications gateway computer 82. Token ring 76 services catalog file and reference services computer system 72, catalog and software distribution server 74, and PS/2-OS/2 78. Token ring 94 services system and file monitor server 96 and PS/2-OS/2 92. The local area network backbone 98 further supports and EDI gateway pricing decision computer 80. Catalog maintenance activities are input to the Maintenance Entity 100 from remote terminals 52 and 54 via token ring 56 through T-1 leased lines 62. Application development occurs remotely, item 58, and is communicated to the operations environment through application development Token Ring TORONTO 60 and routed to development server 84.

The client environment is shown in the lower segment of FIG. 6, defined by shadow server 106 which maintains a customized copy of the master catalog for distribution to local clients 102 and 104. Purchase orders are received by a Local buyer master server 86 from a data pathway connecting remote shadow LAN 108 with local buyer master LAN 88. The Buyer Master Server also performs the server function in the following capacities; order processing from buyer clients 90, approval and call back. The Buyer Master Server communicates with the operations environment of the enterprise through a 56 Kb switched or leased TCP/IP line 107.

The Buyer Master Server also interacts with the Range of Legacy Systems which consists of a host computer 64 connected to a COMM FEP 66, a MINI computer 68, and a PC 70. The services provided by the Maintenance Entity distinguish this invention from the electronic catalogs offered by public networks such as Prodigy (tm) and Compuserve(tm), which do no more than route messages from the subscriber to the supplier. The Maintenance Entity services act as a single point of contact to all the suppliers on one side and all the buyers on the other. Existing networks merely link them in a many-to-many relationship. The advantages of this approach are clear: for example, a supplier has only to provide a change to a catalog item once to the Maintenance Entity, which then disseminates it to the affected users.

Figure 3:
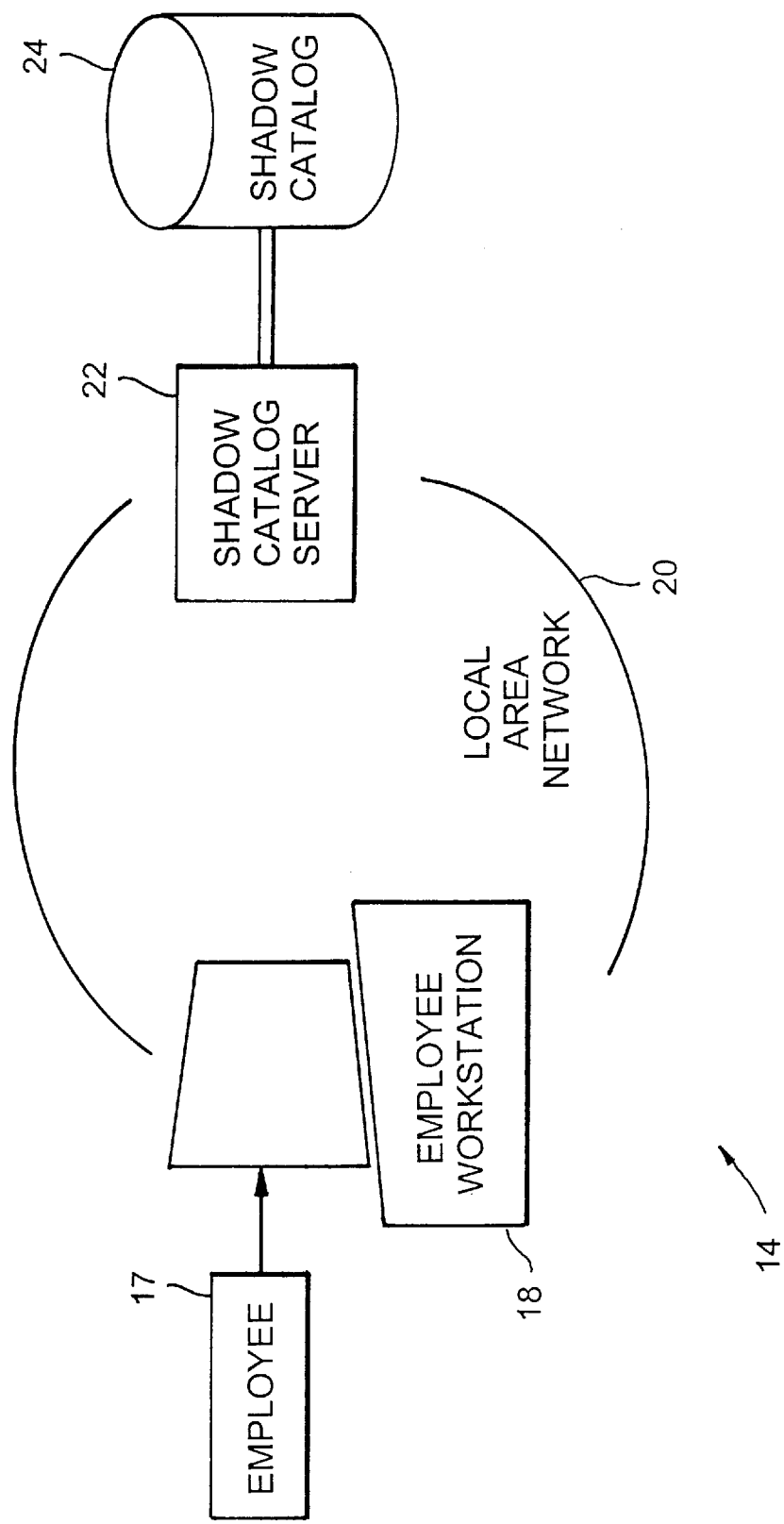
FIG. 3 shows an end-user environment.
Figure 4:
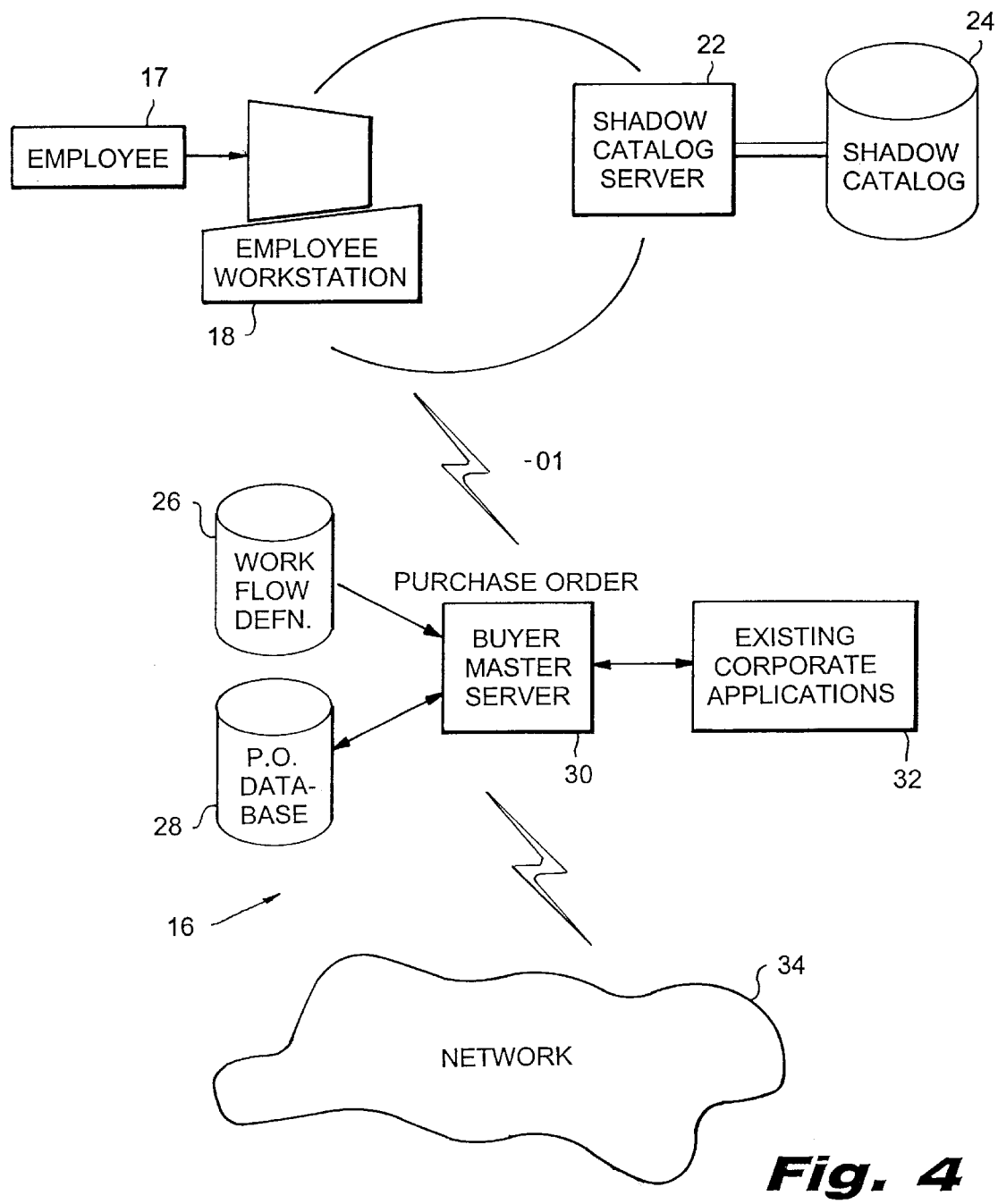
FIG. 4 shows a client environment.
Figure 7:
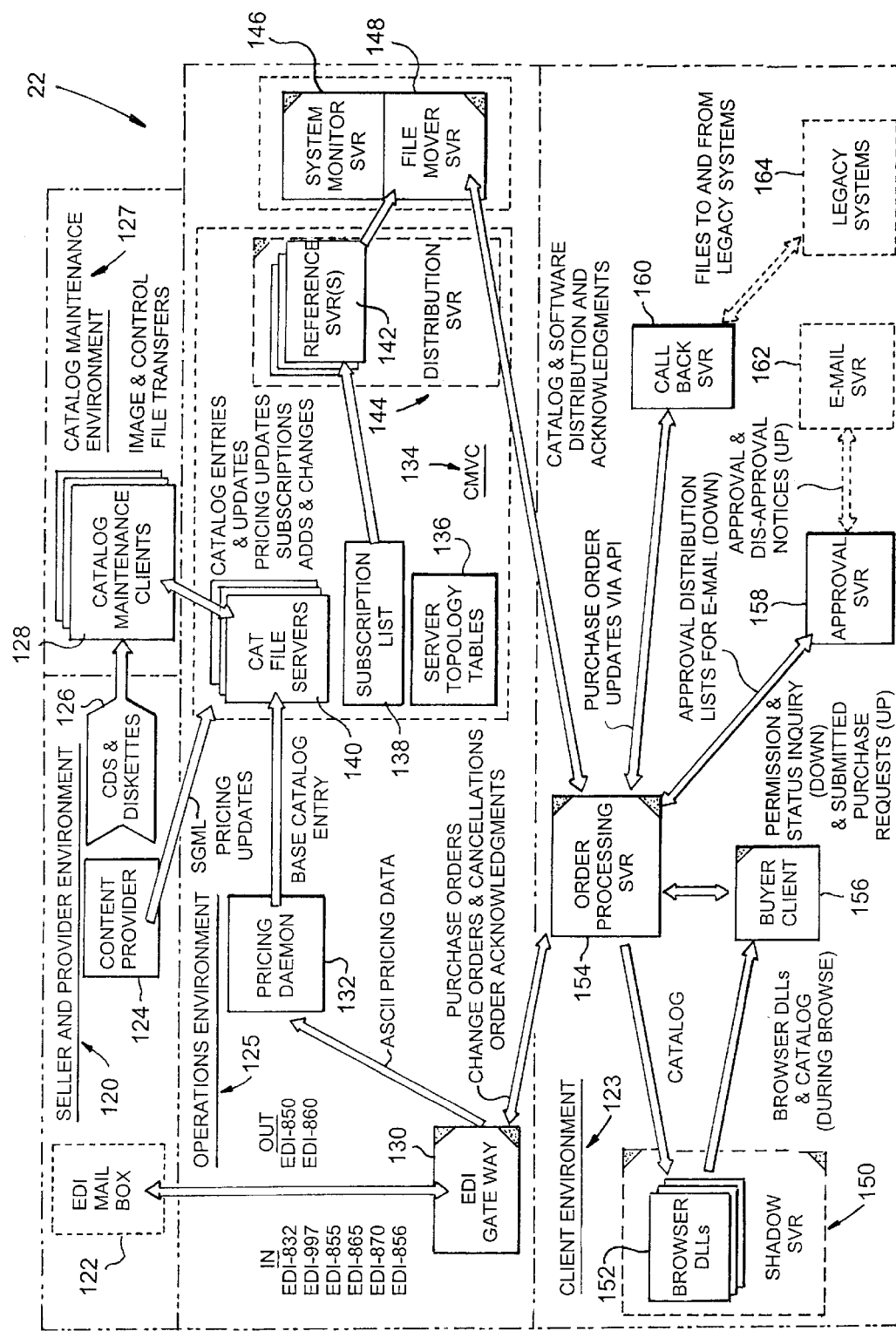
FIG. 7 provides an overview of data flow between logical servers.

This aspect of the invention is summarized in FIG. 7, numeral 22 which shows the data flows already mentioned in FIGS. 3, 4 as well as some others which were omitted from the original description for the sake of clarity. The omitted data flows include details specific to both the Operations environment and the Client environment:

1. Details of the Operations Environment 125 Networking software and services software including; a PRICING DAEMON 132 which receives purchase orders, change orders and cancellation order acknowledgments from the ORDER PROCESSING SVR 154 located in the Client Environment 123 via an EDI GATE Way 130. The Pricing Daemon 132 in turn provides pricing updates and base catalog entries to catalog file servers, CAT FILE SERVERS 140.

The operations environment further includes distribution management tools, defined generally by CMVC 134. The CMVC consists of a Subscription List 138 which resides on a server in the form of topology tables 136. The subscription list sources multiple reference servers 142, all of which are contained within a distribution server 144. The reference servers source a combination server comprised of a system monitor server 146 and a file mover server 148.

1. Details of the Client Environment 123

Comprised of a Shadow Server 150 consisting of Browser Dynamic link libraries DLLs 152. The Browser DLLs receive catalog data from the Order Processing Server 154 and in turn output the Browser DLLs and customized catalogs, during a client browse session to a buyer (client) 156.

The Order Processing Server receives inputs from four separate sources; (1) Buyers (clients) 156 (2) the Approval Server 158 (3) the CallBack Server 160 which services the transfer of files to and from legacy systems 164 and (4) the File Mover Server 148, which is part of the Operations Environment.

This aspect of the invention preferably comprises (see FIG. 7) three major components:

1. Catalog creation and maintenance tools (shown at the top of Fig. 7). Catalog creation is defined by item 122, the SELLER AND PROVIDER ENVIRONMENT consisting of EDI MAIL BOX 122, CONTENT PROVIDER 124, and CD's & Diskettes 126.

Catalog maintenance is defined by item 127, CATALOG MAINTENANCE ENVIRONMENT, which includes item 128, CATALOG MAINTENANCE CLIENTS which receives inputs from CDS & Diskettes 126 and additions and changes concerning catalog entries & update, pricing updates, and subscriptions from CAT FILE SERVERS 140.

2. Catalog browsing and purchasing software (the client environment shown in the lower segment of FIG. 7); and, 3. Networking software and services (the Operations environment shown in the middle segment of FIG. 7) defined by OPERATIONS ENVIRONMENT 125.

Catalog Creation Maintenance

Figure 8:
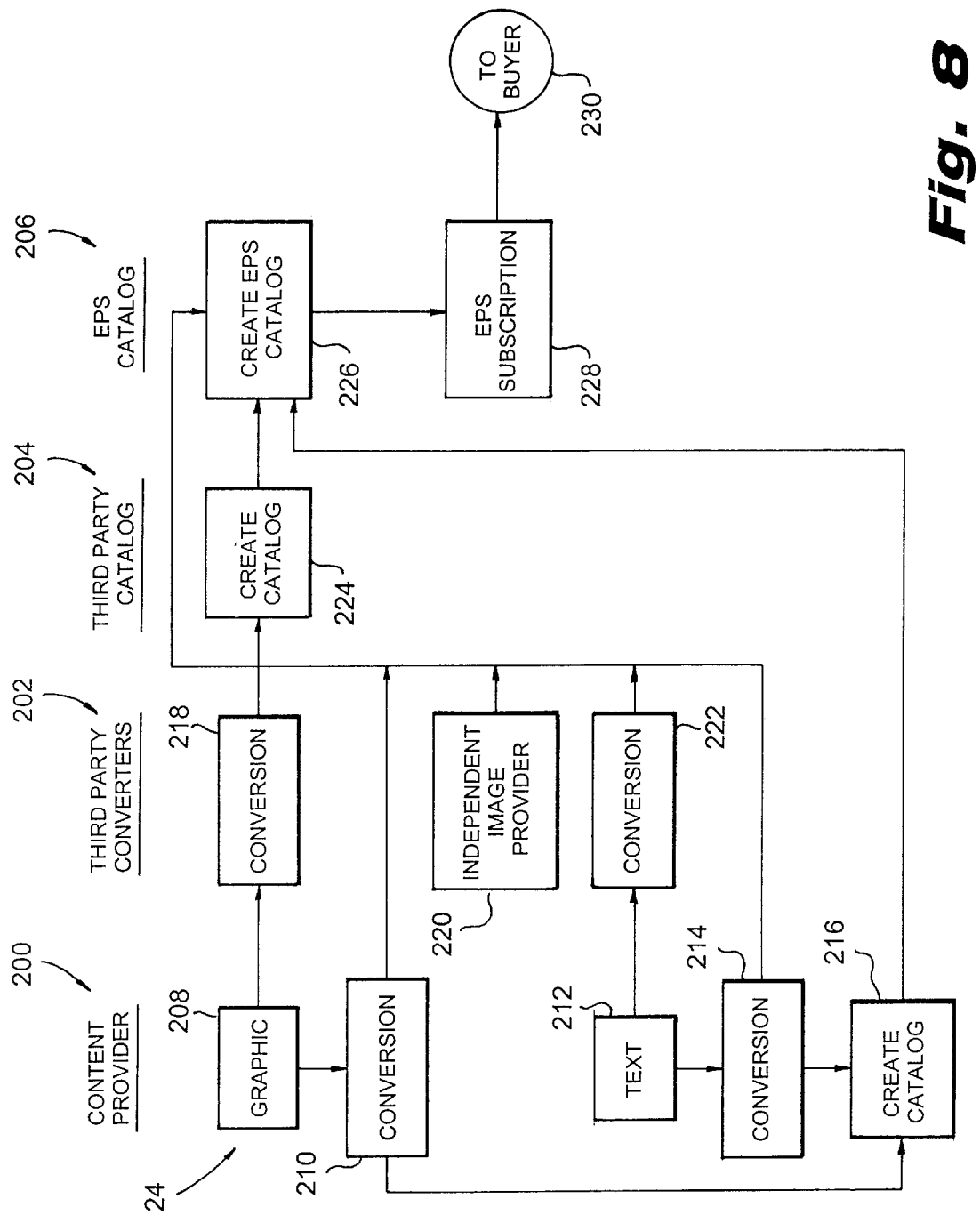
FIG. 8 shows catalog enablement.

The preferred embodiment is made up of two main elements:

Content mianagement tools to receive, process, and manage images 208 and text 212 from content providers 200 for the creation of an EPS (Electronic Purchasing Service) master catalog. An overview of this process is shown in FIG. 8, numeral and Text 212 from content provides 200 are first converted through conversion units 210, 214 also, including conversion units, 218 and 222 from third party converters 202, the graphics and text are then and combined with content from independent image providers 220 to create catalogs 216 and 224 constituting third party catalogs 204 which are then combined at an EPS catalog stage 206 to form EPS (Electronic Purchasing Service) catalog 226 and distributed to buyers 230 via EPS subscription 228;

These enable EPS Operations staff to create and manage catalog information in the merchandise database such as the price, description, and visual representation of each item.

Distribution management tools to receive vendors' price and catalog updates, as well as to propagate the changes to the customers' Buyer Master servers.

Content Management Tools

The EPS Content Management tools preferably comprise:

FotoFarm;

Product Editor;

Folder Editor;

Subscription List Editor;

NAM2DAT/NAM2GRP.

FotoFarm

Figure 9:
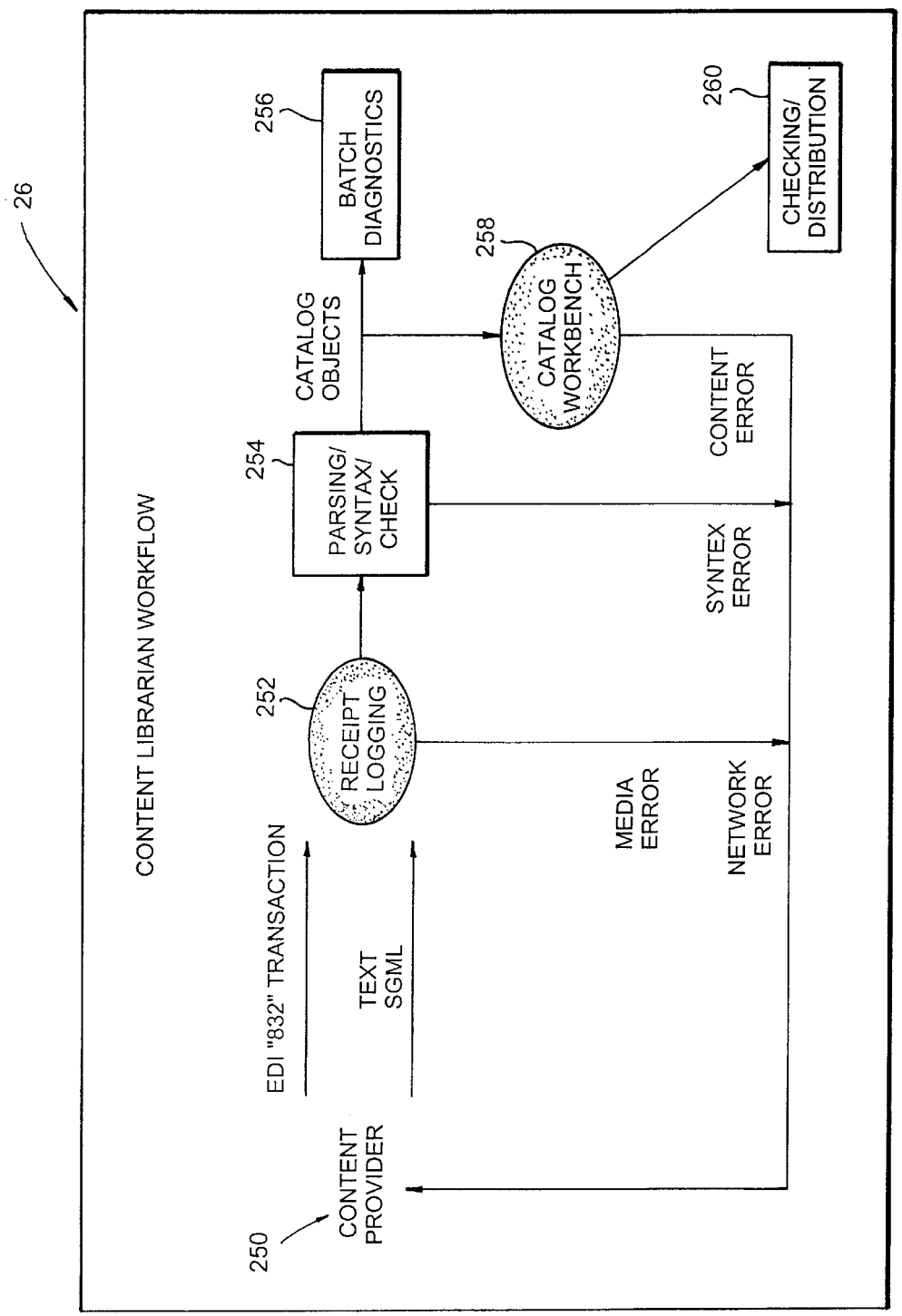
FIG. 9 shows content librarian workflow.
Figure 10:
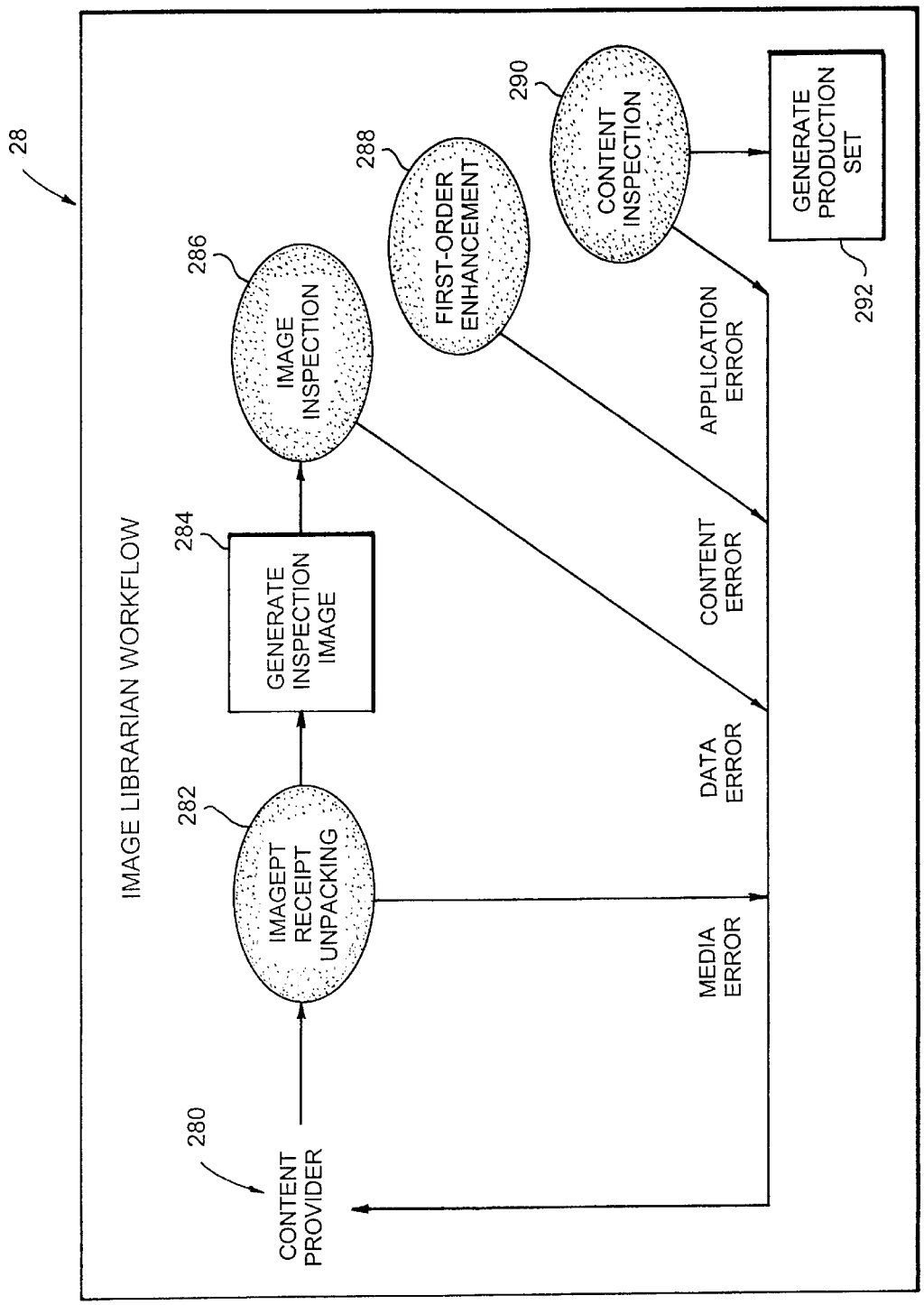
FIG. 10 shows image librarian workflow.

This collection of utilities may be used to convert text and images from the content providers 200, 250 and 280. The workflows of these two activities are shown schematically in FIGS. 9, 10 numerals 26, 28. Supported functions may include:

Receive, store, and archive source images 282 and text files 252 and 282.

First-level validity check of source media 254, 284 and 286.

Assign EPS unique filename and update the index files 258, 284.

Create master catalog's subchapters and folders, and populate them with the relevant contents 260 292.

Trigger down-stream re-creation or subscription catalogs (see below) when EPS catalog updates occur 260 292.

Process images received from content providers in batch model 256:

Delta cropping of image by specifying new crop coordinates 288.

Generate multiple resolution versions of images.

Convert 24-bit to 8-bit dither with palette matching.

Enable re-scheduling of batch process for related information.

Allow multiple images to be proofed at the same time.

Manage registries of 260 292:

Shared disk storage for various purposes;

Providers of images, text, or EDI content and services;

All top-level books in the EPS Catalog Server.

Product Editor

This ITS (Iterative Transaction Systems) application enables EPS Operations staff to:

View multiple product descriptions at a time;

Associate images with product handle;

Save, import, and create templates;

View and edit product descriptions.

Folder Editor

Figure 11:
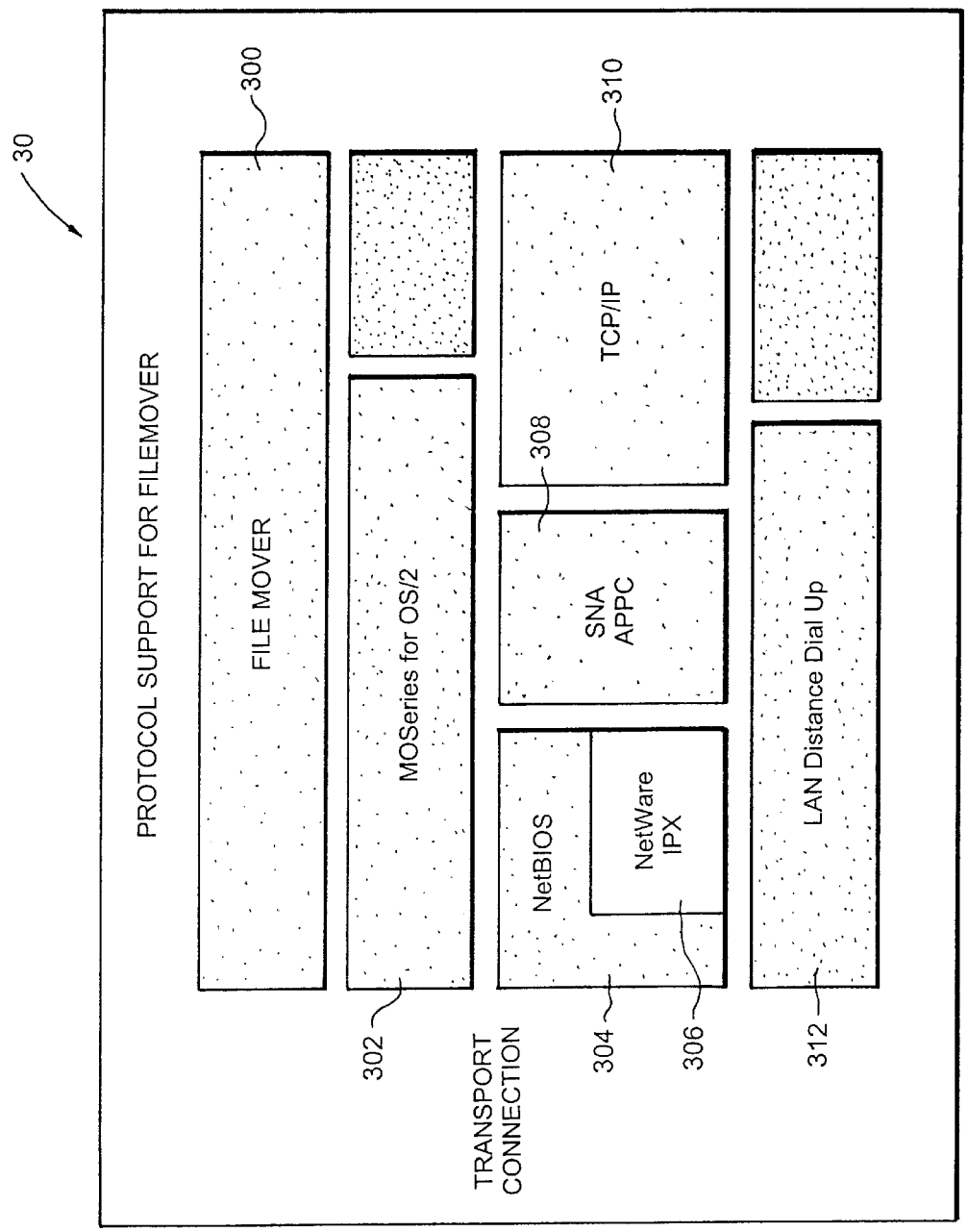
FIG. 11 shows a protocol support for filemover.

A sample screen from this tool is shown as FIG. 11, numeral 30. This tool enables Operations Staff to:

View master catalog space.

Organize and arrange products into groupings, i.e., manipulate Catalog topology.

Search: Keyword, Power Scarch (Attribute, Taxonomy).

Subscription List Editor

This uses code from the Folder Editor and Search Engine, with additional functions, to enable Operations staff to:

Save subscription profiles;

Update/edit Distribution Frequency via manual operation;

Update/edit Distribution Frequency automatically;

Generate flat or hierarchical browser space;

Send newly created subscription list to Catalog Server.

NAM2DTA/NAM2GRP

NAM2DTA is a stand-alone GML parser that converts tagged source files to catalog objects. NAM2GRP is a stand-alone GML parser that converts tagged source files to catalog folders.

Distribution Management Tools

Distribution Management concerns itself with getting data from Network Central out to the customers' computers on the network in such a way that each computer receives only that data (catalog items and price information) which it needs. The EPS Distribution Management tools preferably comprise:

Distribution Manager with GUI query tool;

Catalog daemon (CATD);

FileMover.

Figure 2:
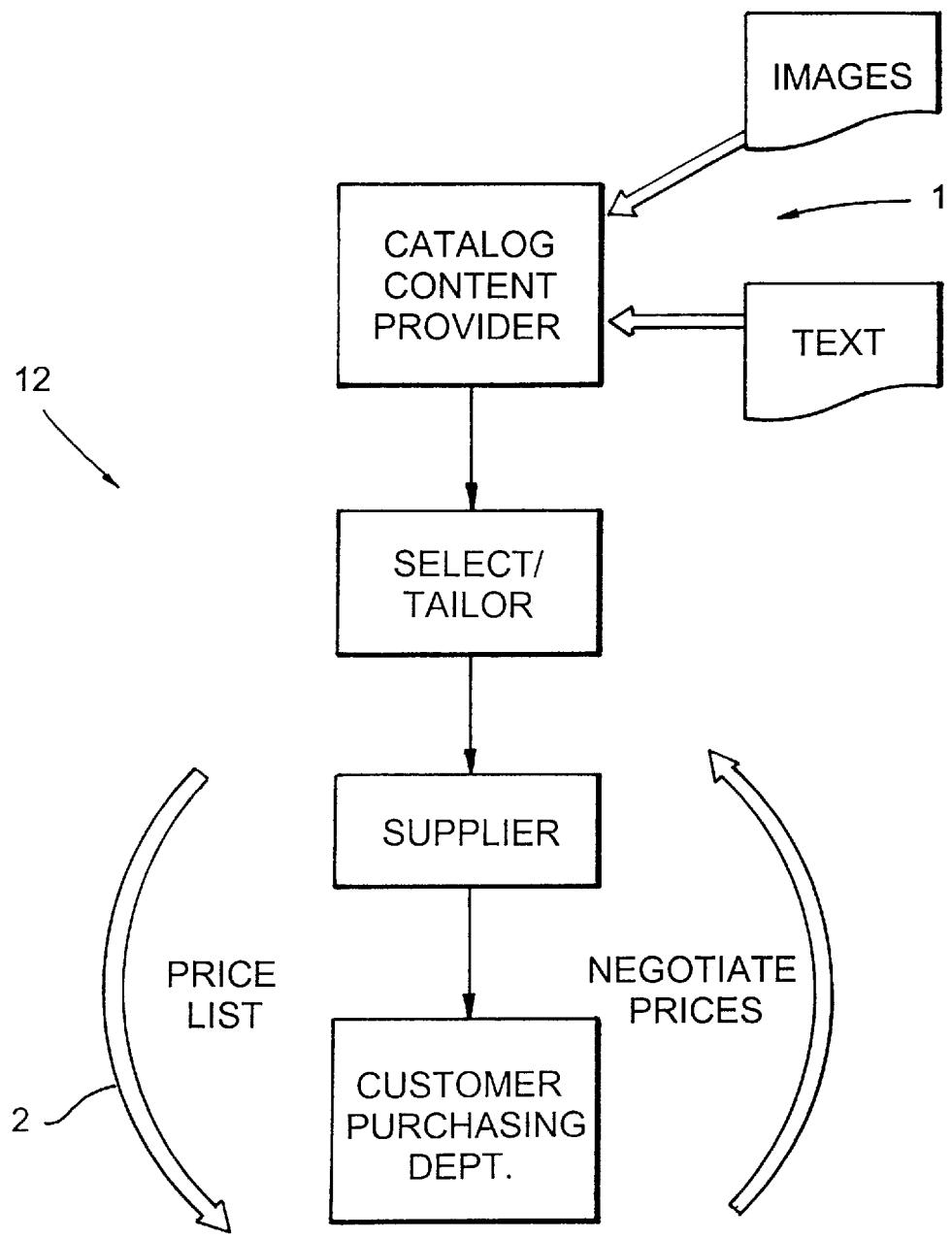
Figure 12:
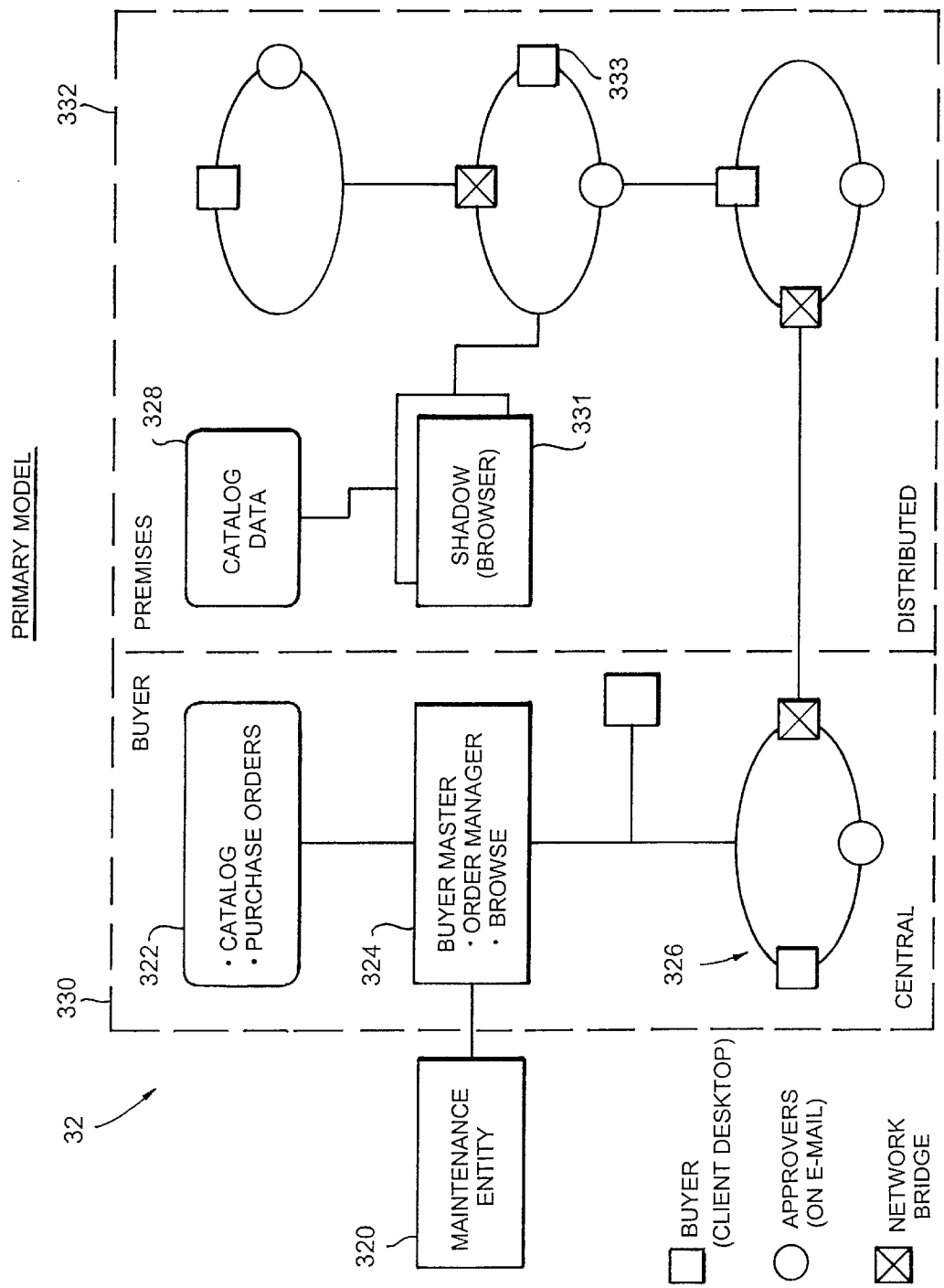
FIG. 12 shows a distributed procurement service.

Distribution Manager
  Responsible for
  Price Update (Catalog Monitor);
  Catalog Update (Catalog Monitor);
  Automated EDI Processing and Distribution (Update Daemon);
  Acknowledgement Processing;
  Update DB2/2 Tables.
Catalog Daemon (CATD)
  This software runs in customers' servers and polls mailboxes to apply updates, and preferably monitors channels for action objects including: Images; Applications; Prices; Catalog descriptions. It preferably can Execute action specified in action object; Forward acknowledgement objects to parent; and is Used together with FileMover daemon to verify file movement.
Filemover 300
  This is the communication layer of EPS which moves files between systems. In particular, it drives the movement of data throughout the network for price up-dates and purchase orders.
  Filemover uses a simple mail-like mechanism in which files are moved from OUTBOX directories to INBOX directories, which can span network attached systems. It has no knowledge of the type or structure of the file it moves, and treats them all as binary blob data. Hence no code page translation or character set translation is attempted.
  Filemover is a Point-to-Point protocol and does not provide any internal routing mechanism. Routing can be provided outside of the Filemover, however, by:
  Utilizing the routing mechanisms of the underlying protocols, e.g., TCP/IP. Will only work across machines running in a single internctwork with the same protocol.
  Using Catalog Daemon (CATD) to provide routing by forwarding files across intermediate nodes. It works across internetworks with different communication protocols but its network path must be hard-coded within the catalog files being sent.
Filemover enables the EPS to:
  Move files of any size and takes care of splitting and reassemblying the files when the underlying communication software has a limitation on the file size.
  Verify and confirm both file movement and ability to move files (e.g., checks disk storage).
  Support file movement over systems connected with multiple protocols (shown schematically in Fig. 11):
    IPX/SPX 306
    NetBIOS 304
    TCP/IP 310
  Support file movement over:
    Dial-up connection (SLIP and LAN Distance 312) via modems
    Dedicated LAN or WAN connection
  Support Store and Forwarding of files 302.
  SNA APPC 308
Client Environment
  Recall that the Client Environment (FIG. 7) comprises two principal components:
  1. An electronic catalog in a format that can be browsed, searched and ordered from, by a corporate employee with no training in Purchasing procedures;
  2. Software that controls the flow of a purchase order through an enterprise's procurement procedures.
  The preferred embodiment of the above software and related manual processing minimizes data storage requirements and maximizes the responsiveness of the total system preferably by employing a primary model consisting of two major components, a buyer side component 330 which communicates over a network bridge with a premises component 332 (see FIG. 12, numeral 32):
  1. An end-user computer system 333 attached to a Local Area Network or LAN, containing the usci interface;
  2. A "shadow catalog server", 331 (FIG. 12-2) with disk storage that can be accessed over a LAN by one or more end-users' computers, the disk storage being used to hold one or more electronic catalogs 328 and program code 331 to enable browsing of the catalog and transmitting purchase orders to the "buyer master server" 324;
  3. A "master buyer server" 324 (FIG. 12-3), which is a computer system within the enterprise containing (1) program code (described below) which can take purchase orders 332 from one or more end-user computers and control their flow through the enterprise's business processes, as described under "Workflow" below, before transmitting them over a network to the supplier via the Maintenance Entity 320 and (2) a to a Purchase Order data base 322 that can be accessed over a LAN 326.
  A preferred embodiment of the above comprises:
Order Manager and Catalog Browser
  This function runs on the end-user's personal computer, although the code would normally reside on disk storage in a catalog shadow server machine. It provides the following main function to an employee using the system:
Log on/Password Security
Login
  Log into EPS
  Track User ID for all transactions arising from this session.
  Additional Order Manager functions may be enabled or disabled based on the login profile.
  User selects from list of authorized users.
Catalog Browser
Browse Product Images, Text and Prices
  Able to page forward or backward.
  Quick return to top menu page from any part of the catalog.
  Quick return to the table of contents from any part of the catalog.
  Display previous page at top of screen, with links to navigation log.
  Images are displayed in .BMP format.
  Two separate image files are kept for OS/2 and Windows. See also "FotoFarm", supra.
  Text The Browser may select zero, one, or more ordered sets of descriptive phrases.
  Prices.
Select Product Based on Single Keyword
  Based on index search.
  Index search is launched with user's action on an icon represented by a magnifying glass.
  Search by product type or manufacturer's name.
  Copy to clipboard for further processing.
Compare Products (max. 4)
  Compare up to four items from the same category.
  End user selects this option by clicking on a "Compare" icon represented by a scale.
  Varying features amongst the compared products are highlighted in bold text.

Product Clip Board
  Select items on Product Listing for adding to clipboard.
  Add item on Product Page to clipboard.
  Delete an item in the clipboard.
  Change the quantity of an item in the clipboard.
  Clear the clipboard to remove ALL items.
  Save the clipboard (to a file).
  Submit the clipboard (as a purchase request).
  Show the items on the clipboard.
  View clipboards (i.e. saved clipboard files).
  Purchase Request Generation Select the recipient of the purchased items from a list. The recipient list is kept in a local disk, and its entries can be added, changed, or removed.
    Classify all line items into capital and expense items.
    Ask for budget number for capital items.
    Ask for engagement number for expense items.
    Display generated purchase request for confirmation.
    Select approver from list to submit request to.
    Add comments to purchase request.
    Send purchase request to approver.
    Save purchase request as clipboard.
    Cancel submission of purchase request.
    Print Clipboard: This function is in addition to, and separate from, the report generation functions which use DB2/2 report generators. It enables users without access to DB2/2 to print a clipboard or submitted order from their own workstations.
    The supported functions include:
    Generate printed output from client application for the contents of the clipboard.
    Can also be used for printing a submitted order.
    Able to generate output for various printer formats including Postscript. May have to go through some type of metafile generation process.
    Needs to work in both OS/2 and Windows.
Purchase Order Creation
Multiple Sellers on One PO
  Each line item in a purchase request could be sent to a different vendor. This requires that information such as the shipping and billing address be stored on a line item level, rather than at the header level for a purchase order. These multiple sellers include those whose products are not listed on the catalogs.
Electronic PO
  This is to forward the purchase orders electronically to the vendors via the EPS. system. Data includes type of transaction, required data as defined by EDI standards for a 850 PO such as PO number, date, name & address, customer ID, customer master record for shipping and billing information.
Print Paper PO
  Print PO by vendor in a multi-vendor PO
  Sub-function of the common printing functions described in "Report Generation", infra.
PO Processing
Manual Status Update
  Purchaser can update status of PO manually after receiving acknowledgements, status updates, etc. from vendors via fax, phone, or mail. Changes to the PO can then be saved to the DB2/2 database on the Purchasing Server.
Line Item Modifications by Client
  The quantity of line items can be increased or decreased prior to order submission. After an order has been submitted, the quantity can only be decreased.
  The quantity of line items can be decreased to zero.
  A line item can be deleted once an order has been placed with a vendor and is being fulfilled by the vendor.
  Allow client to modify other fields such as requested ship date, shipping and billing address, add comments to line items (e.g., a banking institution).
  Possibly allow client to switch partnumbets, delete line items, add new line items.
Change Logging/Reporting
  Changes to the POs are recorded in the logs and can be accessed by the report generation functions.
PO Maintenance
Browse POs
  Group existing POs in ciapteus with summary information including:
    Request number.
    Requester.
    Recipient.
    Request date.
    Total price.
    Line of Business.
    Scroll through all line items.
    Sort line items by column headings in the following order:
    Sort numeric columns from high to low or low lo high.
    Sort alphabetic columns from A to Z or Z to A.
    View details of line items by clicking on them.
    Search for specific groups of POs and purchase requests by Requester Name, Requester Date, and Request Number. The search results can be grouped into a chapter.
View Approvers
  Enables user to look up list table of associated approvers for a PO.
  Approvers are item-based; i.e., each item has its own approver.
  Enables user to view approval data for each item, with the approvers name, decision, and date of action.
Check Status
  Enables users to check current status of POs. * When orders are placed, vendors send acknowledgements and status messages via EDI. These are reflected in the updates to the status of line items, with the date of the status change.
  The approval status of each order or request can also be checked.
Cancel POs
  Enables users or administrators to cancel POs or purchase requests. This is dependent on whether the order has passed the deadline for the change to be effective. Vendors restrict the set of order states against which a PO can be canceled. For example, if the item has been shipped, the order cannot be canceled. EDI Vendors must be able to support Cancel/Change 860 transactions and their subsequent acknowledgements.
  The end user will be prompted for confirmation of cancellation request prior to processing.
  Upon confirmation of cancellation, the order is moved to the Canceled Requests chapter.
Note
  If the PO has already been sent to the vendor, an additional EDI (860) transaction is generated and budgets credited.
Add Approvers
  This function is required for customers who are not using e-mail approval.
    Requires end-user interface to be modified to make the approver line items editable.
    Changes must be saved back to the database.

Delete Approvers

This function is required for customers who are not using e-mail approval.

Order Manager Admistration

Budgets

All line items for capital purchases are charged against the capital expense budgets.

Budget Information: Each budget has the following information:

Budget number

LOB (line of business)

Line of business related to the purchase.

Allocated

Amount allocated to the budget.

Current Requisition

Amount associated with all active orders.

Ordered

Amount for orders that have been sent to vendors.

Balance

Balance amount available in the budget.

Active

Yes for an active budget.

No indicates a budget that has been closed and no expenditure can be charged against it.

Create new capital budget: The following information is preferably required:

Budget number

Amount allocated

Amount allocated to the budget.

Active status

A Yes to indicate that it is active.

LOB (line of business)

Line of business the budget is assigned to.

Description of budget

Brief description of the purpose of the budget.

Change existing budget: Changes can be made to the following aspects of the capital expense budget:

Amount allocated

Amount allocated to the budget.

Active status

A Yes to indicate that it is active.

Description of Budget

Brief description of the Purpose of the Budget.

All changes are logged to the change history log, which can be viewed.

Delete existing budget: This function may be used to clear existing budgets at the end of a fiscal year.

There will be a prompt for the user to confirm deletion of the budget amount.

View budget history

All changes to the allocated amount and status of the budget, as well as all expenditures are logged.

Each transaction is logged with a brief description of the activity attached.

The last 100 transactions are logged.

This view function is applicable to both active and inactive budgets.

Import budget guidelines: This is to enable the import of budgets from SAP, or another accounting interface, for the initial budget creation.

Track budget: All line items in a PO get charged to either an expense or capital budget. Any modifications to the PO requires that the budget balances get updated.

User Profiles

The following functions are provided:

Add new users Authorize new users to the list of authorized users.

Delete User

Update current user profile

Ship/Bill Update (Per Site)

This is to enable the purchasing administrator to maintain the shipping and billing addresses of all locations within a Customer enterprise. These addresses are referenced by POs to define the shipping and billing destinations. The supported functions include:

Add new address;

Update current address;

Delete current address;

Vendor Info Update

This is to enable the purchasing administrator to maintain the EDI vendor addresses for confirmation of shipment and billing, as well as status updates. The supported functions include:

Add new address;

Update current address;

Delete vendor address.

Define Company Policy For Captial/Expenses Purchases

Line of Business

Add new line of business;

Update line of business information;

Delete line of business.

Report Generation

This includes the common printing functions for both the reports and purchase orders. They include:

Commodity reports;

Line cost reports;

Order modification reports;

Budget modification reports;

Customized reports.

Approval Workflow

Approval workflow is controlled by the Approval Manager residing in the Purchase Server in the customer's site. This workflow of the purchase orders between the customer and vendors is enforced by a PO approval process defined by the customer. Its functions include:

Keep track of a PO's approval status from the moment a purchase requisition is generated. Appropriate actions are taken to forward the purchase requisition to the predefined approvers to be approved or rejected.

Interface with the customers' electronic mail systems to post approval notifications for the necessary action by designated PO approvers.

Provide separate ITS client application to allow PO approvers to approve purchase requisitions directly from within the EPS system rather than from the external email system.

Approval Policy Configuration

Set up Lotus Notes DB to specify approver hierarchy.

Use of REXX code to customise approval hierarchy.

Approval Data

Store approval data for POs in DB2/2 PODB;

Store list of approvers in Lotus Notes;

Entry point API (call-out) to support accessing approvers from external systems.

Approval List Generation

Print approver Lists from Lotus Notes;

View approver Lists from Lotus Notes;

Lotus Notes interface to create and update approvers list (company wide);

REXX code to specify approval policy given PO and list of approvers;

Generate Approvers service application 158 to communicate with client server API CORDER PROCESSING SVR 154 (per PO).

Approval List Processing

Approvers can receive email messages via an E-MAIL SERVER 162 notifying them that they need to approve various purchase requisitions.

Mail routing support is available for Lotus Notes, cc:Mail, and Microsoft Mail.

Snapshot Database Within Lotus Notes

This is a function to synchronise the information between the EPS Server and the Lotus Notes server.

Help Functions Within Lotus Notes

A help database is available from within Lotus Notes as a Notes database.

Approval Manager Client

This ITS client application is for approvers who do not want to receive approval notification from an email system external to EPS. It enables approvers to log on to the EPS Purchasing Server and approve or reject purchase requisitions.

PO Workflow

The flow of the purchase order through an enterprise's approval and other financial processes varies with each enterprise. The disclosed system contains workflow logic implemented as a Finite State Machine. This is a table specifying how the system is to change state in response to specified inputs, and what actions it should take when each transition takes place. Such a table can be easily tailored to fit the needs of a particular enterprise. Application Program Interfaces (APIs) in the generic state transitions supplied with the system allow an enterprise to invoke and pass information to and from existing computer applications and data bases (which could include the enterprise's "legacy" purchasing system) as shown in FIG. 4 step 02.

In the preferred embodiment, The EPS Client/Server application programming interface (API) provides client applications with a set of functions and action calls to communicate with the EPS Server for managing purchase orders within the customer's environment. It can also be used by any customer applications to work with the data available from the server.

The API supports three types of client applications:

Interactive Transaction System (ITS) applications

These are clients written with the ITS toolkit and using the ITS runtime to provide the user interface.

Non-ITS applications

These are clients that have user interfaces other than ITS.

EPS system extensions

These are ITS and non-ITS applications registered with the Purchase Order workflow of the EPS server, and can be classified into two categories:

1. EPS Monitors

Registered against a certain state in the Purchase Order workflow and are notified whenever any purchase request enters that state. The notification will be received asynchronously with the purchase request continuing within the workflow.

2. EPS Services

Registered with the EPS Server and introduce a new state in the Purchase Order workflow. They are notified whenever any purchase request enters that state, and are expected to notify the EPS Server when the specific task is completed.

API Architecture

Figure 5:
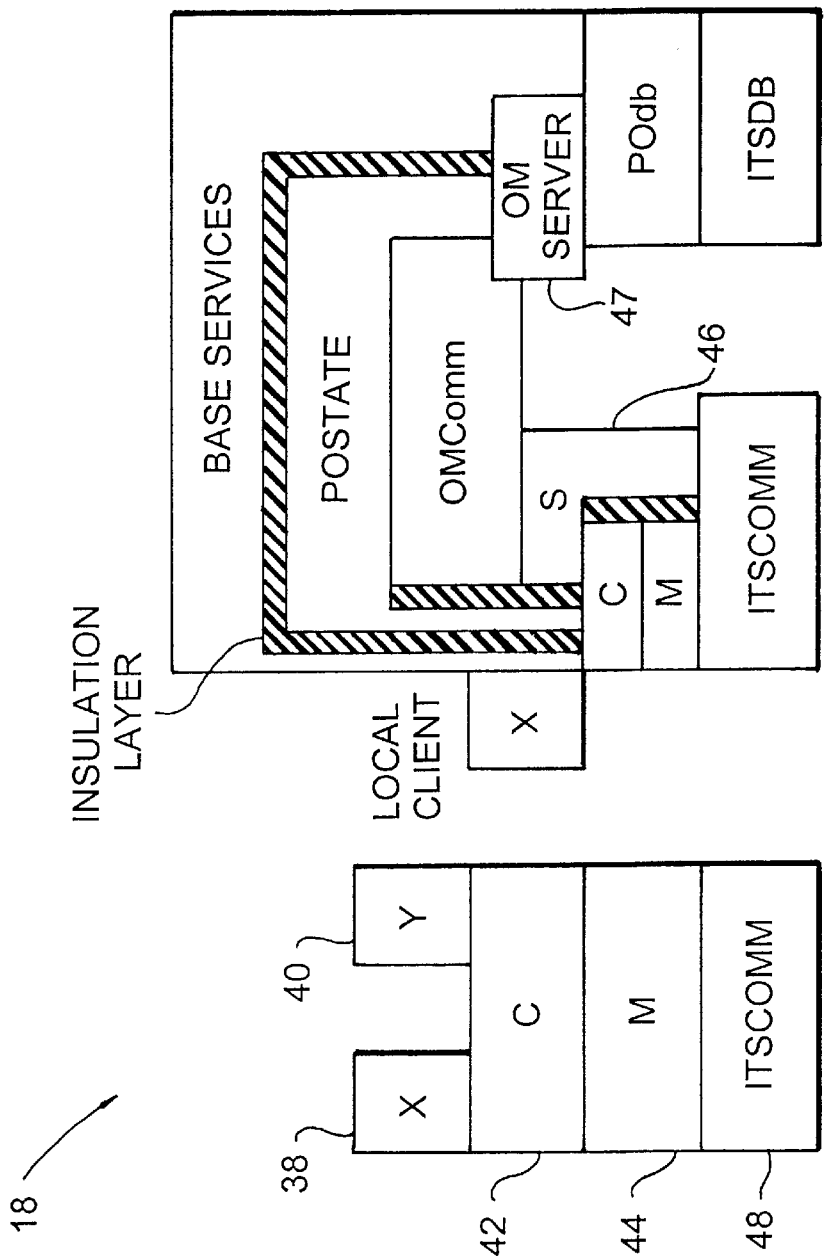
FIG. 5 shows a sample screen for features of the present invention.

A brief description of the API architecture is necessary for an understanding of the API functions and action calls. Essentially, the API is made up of five layers, as shown in FIG. 5:

X layer 38 This is the ITS application layer which interfaces with ITS client applications to deliver ITS client application requests to the C layer for onward transmission to the Buyer Master.

Y layer 40 This is the non-ITS application layer which interfaces with non-ITS applications to deliver non-ITS client application requests to the C layer for onward transmission to the Buyer Master.

C layer 42 This is the common layer that interface the X and Y layers with the M layer. It takes application level data structures from X or Y layers, converts them into low level communication data buffers, and invokes M layer functions with these data buffers to communicate with the EPS Server.

M layer 44 This message layer is the lowest level EPS API communication layer. It uses the ITSCOMM 48 API to handle protocol specific communication functions. It handle communications data buffers instead of application level data structures.

S layer This is a server interface layer and handles functions between the C layer of EPS Server and the OM Server layer 47.

In addition, the EPS Client/Server API has a set of OMServer APIs to support client requested actions on the EPS Server from the S layer 46.

APIs

Logically, the EPS Client/Server APIs can be grouped into four areas:

Information

These include the functions and actions to Get and Save data of predefined datatypes to the EPS Server.

Monitors

Services

Security

These validate clients and restrict the level of access. These include: Logon, Logoff, Connect, and Disconnect.

THE NETWORK ENVIRONMENT

"Network Central" (shown in the middle of both FIGS. 6, 7) consists of one or more computers and program code of the type located in IBM's Advantis network, which provide four principal functions:

1. receipt of purchase orders from the master buyer servers of one or more enterprises;
2. passing EDI transactions to and from suppliers;
3. storing catalog information for transmission to buyers;
4. the distribution of price information.

In addition, personnel at Network Central may perform many or all of the activities described under "Catalog Creation/Maintenance" above.

Overview of EDI

The Electronic Data Interchange (EDI) is a standard for the exchange of business data. It defines:

Communication wrappers, which are usually handled by a communication package from a Value Added Network (VAN) providing EDI mailboxes).

The ASCII character set.

Various transactions, each with an ID

The order and hierarchy of data within each of the transactions.

The type and length restrictions for each piece of data.

There are two major EDI standards—ASC X12 which is the standard for the United States, and UN/EDIFACT, which is the general standard adopted by countries outside of the U.S.

EPS EDI Implementation

Customers may be connected to a system like the IBM &EPS. via non-EDI links, sending their purchase orders over 56khs lines. The EDI Gateway translates and maps these communication into EDT messages before using the FileMover mechanism to send them to vendors via its EDI mailbox on the Advantis network. Vendors' acknowledgements and status updates are transmitted as EDI messages to the Advantis mailbox. The EDI Gateway translates them to the EPS format and updates the PO status accordingly.

Currently, the EDI Gateway consists of the EDILISTS application as well as the IEBASE program provided by Advantis to connect to the Advantis network using LU6.2 communication protocol. The gateway logs and tracks all EDI transactions for diagnostic purposes; it can also alert the Network operator for the necessary recovery action when it encounters any unexpected event.

The preferred embodiment supports the following EDI transactions:

832-Create Catalog Content.
850-Purchase Order.
855-Order Acceptance.
856-Shipping Order Status.
860-Change/Cancel Order.
865 and 870-Order Status.
997-Acknowledge Receipt of Order.

Other Gateway Functions

Gateway EDI in-box and PO in-box monitoring
Look for new PO request and translate to EDI.
Look for new EDI transaction and translate to EPS internal format.
Poll EDI mailbox hourly if not done via PO transactions.
Execute utility to access Advantis's mailbox using IEBASE
Upload EPS-generated EDI to VAN.
Download any waiting EDI message.
Directory browsing.
PO lookup, browsing and merge update. Look up and browse archived PO files.
PO/EDI error logging.
Reports all errors and alerts system operator for attention in the event of a major error taking place.
Logs problems to a flat file.
Event tracking and logging.
Catalog tools linking for 832 transactions.
Archiving POs to multiple customer/vendor file systems.

What is claimed:

1. A system for electronically ordering items within an enterprise comprising:

a maintenance entity. located outside said enterprise, for receiving price and availability data from a plurality of distributors and means for receiving and processing images and text of catalog data from a plurality of catalog content providers for creating and maintaining one or more electronic master catalogs in a central location for subsequent distribution to a plurality of shadow catalog servers distributed throughout said enterprise, where said shadow servers contain data representing a customized electronic catalogue from said master catalogs, over a computer network, said maintenance entity comprises:

means for constructing said customized catalog from said master catalogs;

means for receiving a supplier's price and catalog availability changes from a plurality of said distributors and propagating them to one or more selected buyers over said computer network;

means for receiving catalog changes from a plurality of said catalog content providers and propagating them to one or more selected buyers over said computer network;

one or more computer systems, maintained by said maintenance entity, and having means for creating and transmitting to a plurality of shadow catalog servers within said enterprise, images and text of a plurality of catalog items offered by said content provider and price and availability data from said suppliers; said enterprise comprises:

a plurality of first end-user computer systems geographically distributed throughout said enterprise comprising a user interface and able to access disk storage on said shadow catalog server, and having means for electronically ordering said catalog items from said shadow catalog servers;

said shadow catalog servers, which comprise a second computer system whose disk storage can be accessed over a local area network by one or more first end-user's computers; said disk storage being used to hold and maintain (1) one or more customized electronic catalogs, and (2) internal program code comprising a Catalog Browser capable of transmitting purchase orders to a master buyer and server, and having means for allowing an end user to view said customized electronic catalog in order to facilitate comparisons between catalog items from several suppliers, and in permitting orders to be generated containing items from several suppliers;

said master buyer server comprising a third computer system located within said enterprise containing (1) purchase order workflow software comprising an order manager and a purchase order workflow which takes purchase orders from one or more end user computers and controls their flow through said enterprise's business processes before transmitting them over a network to the supplier; and (2) a Purchase Order data base; and means for said master buyer server to receive information from and transmit information to said supplier.

2. A system according to claim 1, further comprising a means for specifying, subscription information comprising a mapping between a plurality of supplier's catalog items and one or more buyers for indicating which catalog items can be propagated to each buyer's catalog server, where said mapping is unique to each said buyer's catalog server.

3. A system according to claim 1, further comprising a means for specifying, pricing information comprising a mapping between a plurality of supplier's catalog items and one or more buyers for indicating which catalog items can be propagated to each buyer's catalog server, where said mapping is unique to each said buyer's catalog server.

4. A system according to claim 1, further comprising an EDI gateway wherein EDI transactions between one or more distributors and said maintenance entity are converted to pricing, catalog availability and purchase order transactions between one or more customers and said maintenance entity, and wherein EDI transactions between one or more suppliers and said maintenance entity are converted to catalog update transactions between one or more customers and said maintenance entity.

5. A system according to claim 1, further comprising a means for enabling said purchase order workflow software to be mapped to the business processes of an enterprise.

6. A system according to claim 1, further comprising mapping tables constructed by said maintenance entity for identifying suppliers, manufacturers, content providers, catalogs, catalog items and buyers for uniquely identifying each, whilst allowing said suppliers, manufacturers, content providers and buyers to continue to use the naming conventions established within their organizations.

\* \* \* \* \*